US010373000B2

(12) United States Patent
Tong et al.

(10) Patent No.: US 10,373,000 B2
(45) Date of Patent: Aug. 6, 2019

(54) METHOD OF CLASSIFYING A CONDITION OF A ROAD SURFACE

(71) Applicant: GM GLOBAL TECHNOLOGY OPERATIONS LLC, Detroit, MI (US)

(72) Inventors: Wei Tong, Troy, MI (US); Qingrong Zhao, Madison Heights, MI (US); Shuqing Zeng, Sterling Heights, MI (US); Bakhtiar B. Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 91 days.

(21) Appl. No.: 15/677,649

(22) Filed: Aug. 15, 2017

(65) Prior Publication Data

US 2019/0057261 A1 Feb. 21, 2019

(51) Int. Cl.

| | |
|---|---|
| ***G06K 9/00*** | (2006.01) |
| ***G06K 9/46*** | (2006.01) |
| ***G06K 9/66*** | (2006.01) |
| ***G06K 9/62*** | (2006.01) |

(52) U.S. Cl.

CPC ....... *G06K 9/00791* (2013.01); *G06K 9/4628* (2013.01); *G06K 9/6267* (2013.01); *G06K 9/6271* (2013.01); *G06K 9/66* (2013.01)

(58) Field of Classification Search

None

See application file for complete search history.

(56) References Cited

U.S. PATENT DOCUMENTS

| | | | | |
|---|---|---|---|---|
| 9,465,987 | B1 * | 10/2016 | Bell .................. | G06K 9/00798 |
| 2010/0086174 | A1 * | 4/2010 | Kmiecik ........... | G06K 9/00798 382/103 |
| 2014/0152827 | A1 * | 6/2014 | Yamamoto ......... | G06K 9/00791 348/148 |
| 2015/0178572 | A1 * | 6/2015 | Omer .................. | G08G 1/0112 382/108 |

* cited by examiner

*Primary Examiner* — Matthew C Bella
*Assistant Examiner* — Brian D Shin
(74) *Attorney, Agent, or Firm* — Quinn IP Law

(57) ABSTRACT

A method of identifying a condition of a road surface includes capturing at least a first image of the road surface with a first camera, and a second image of the road surface with a second camera. The first image and the second image are tiled together to form a combined tile image. A feature vector is extracted from the combined tile image using a convolutional neural network, and a condition of the road surface is determined from the feature vector using a classifier.

20 Claims, 4 Drawing Sheets

METHOD OF CLASSIFYING A CONDITION OF A ROAD SURFACE

INTRODUCTION

The disclosure generally relates to a method of identifying a condition of a road surface.

Vehicle control systems may use the condition of the road surface as an input for controlling one or more components of the vehicle. Differing conditions of the road surface affect the coefficient of friction between the tires and the road surface. Dry road surface conditions provide a high coefficient of friction, whereas snow covered road conditions provide a lower coefficient of friction. Vehicle controllers may control or operate the vehicle differently for the different conditions of the road surface. It is therefore desirable for the vehicle to be able to determine the current condition of the road surface.

SUMMARY

A method of identifying a condition of a road surface is provided. The method includes capturing a first image of the road surface with a camera, and capturing a second image of the road surface with the camera. The first image and the second image are tiled together to form a combined tile image. A feature vector is extracted from the combined tile image, and a condition of the road surface is determined from the feature vector with a classifier.

In one embodiment of the method, a third image of the road surface is captured with the camera. The first image, the second image, and the third image are tiled together to form the combined tile image.

In one embodiment of the method, the camera includes a first camera, a second camera, and a third camera. The first image is actively illuminated by a light source, and is an image of the road surface in a first region. The first image is captured by the first camera. The second image is passively illuminated by ambient light, and is an image of the road surface in a wheel splash region of a vehicle. The second image is captured by the second camera. The third image is passively illuminated by ambient light and is an image of the road surface in a region close to a side of the vehicle. The third image is captured by the third camera.

In one aspect of the method, a convolutional neural network is used to extract the feature vector from the combined tile image.

In another aspect of the method, the condition of the road surface is determined to be one of a dry road condition, a wet road condition, or a snow covered road condition.

In one aspect of the method, tiling the first image, the second image, and the third image together to define the combined tile image includes defining a resolution of the first image, a resolution of the second image, and a resolution of the third image.

In another aspect of the method, tiling the first image, the second image and the third image together to define the combined tile image includes defining an image size of the first image, an image size of the second image, and an image size of the third image.

In one embodiment of the method, the first image, the second image and the third image are captured simultaneously.

A vehicle is also provided. The vehicle includes a body. At least one camera is attached to the body, and is positioned to capture an image of a road surface in a first region relative to the body. A light source is attached to the body and is positioned to illuminate the road surface in the first region. The at least one camera is positioned to capture an image of the road surface in a second region relative to the body. A computing unit is in communication with the at least one camera. The computing unit includes a processor, a convolutional neural network, a classifier, and a memory having a road surface condition algorithm saved thereon. The processor is operable to execute the road surface condition algorithm. The road surface condition algorithm captures a first image of the road surface with the at least one camera. The first image is actively illuminated by the light source. The road surface condition algorithm captures a second image of the road surface with the at least one camera. The road surface condition algorithm then tiles the first image and the second image together to form a combined tile image, and extracts a feature vector from the combined tile image with the convolutional neural network. The road surface condition algorithm then determines a condition of the road surface from the feature vector with the classifier.

In one embodiment of the vehicle, the at least one camera includes a first camera positioned to capture an image of the road surface in the first region, and a second camera positioned to capture the image of the road surface in the second region.

Accordingly, information within the individual images is not lost by tiling the first image, the second image, and the third image together to form the combined tile image, and then using the convolutional neural network to extract the feature vector from the combined tile image. Additionally, the combined tile image enables the convolutional neural network to identify features that may not be identifiable through examination of the images individually. The process described herein reduces the complexity of determining the condition of the road surface, which reduces processing demands on the computing unit executing the process, thereby improving the performance of the computing unit.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Referring to the FIGS., wherein like numerals indicate like parts throughout the several views, a vehicle is generally shown at 20. As used herein, the term "vehicle" is not limited to automobiles, and may include a form of moveable platform, such as but not limited to, trucks, cars, tractors, motorcycles, atv's, etc. While this disclosure is described in connection with an automobile, the disclosure is not limited to automobiles.

Figure 1:
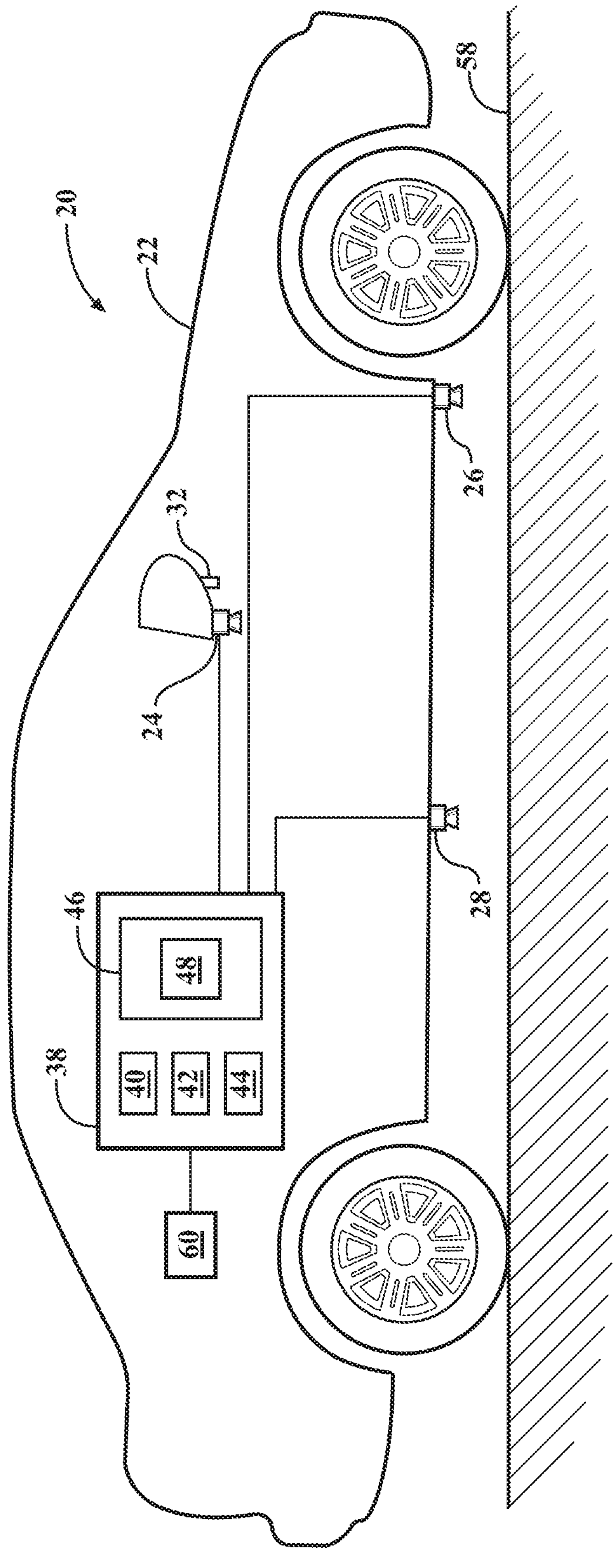
FIG. 1 is a schematic side view of a vehicle.
Figure 2:
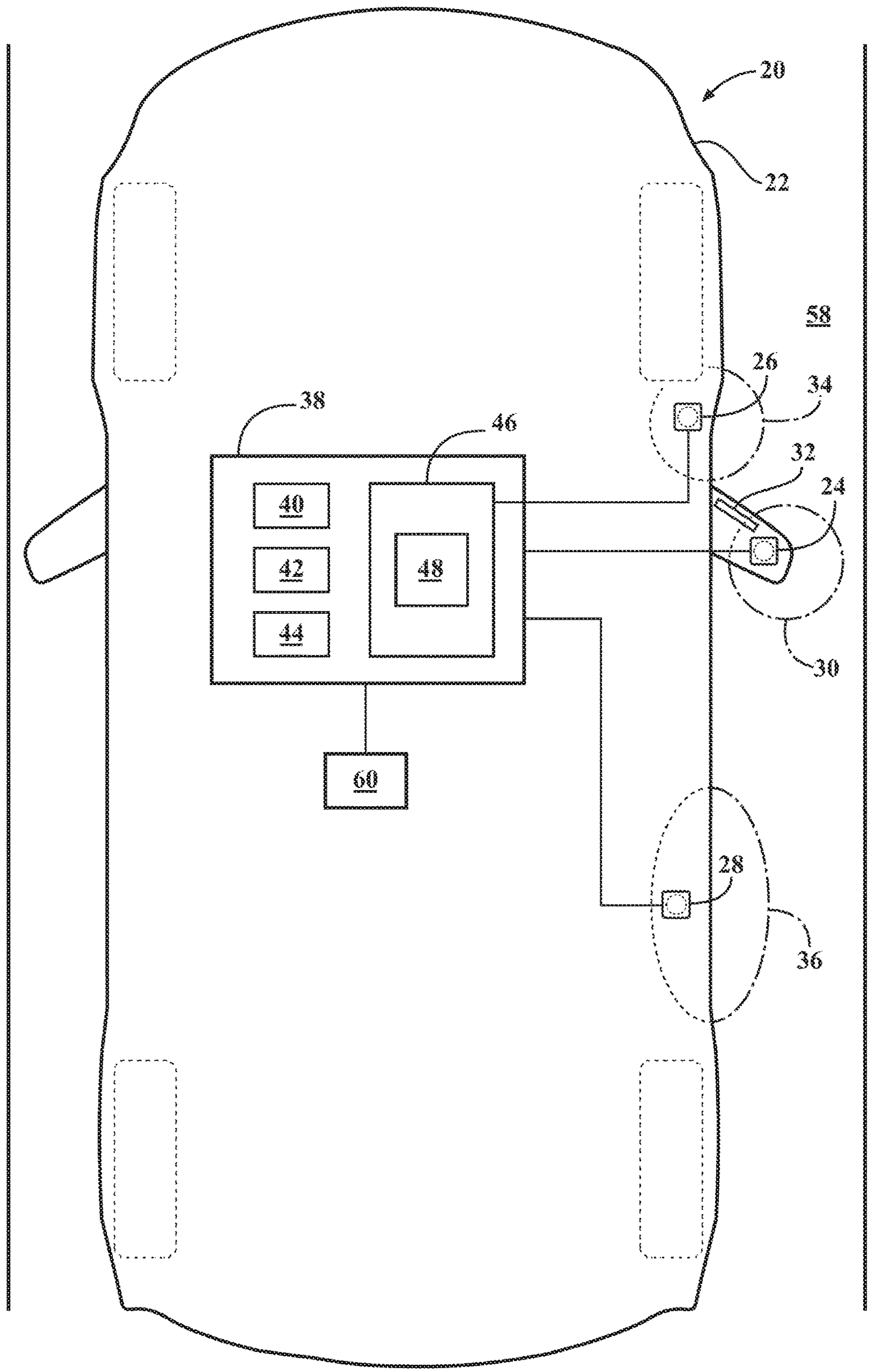
FIG. 2 is a schematic plan view of the vehicle.

Referring to FIGS. 1 and 2, the vehicle 20 includes a body 22. As used herein, the "body" should be interpreted broadly to include, but is not limited to, frame and exterior panel components of the vehicle 20. The body 22 may be configured in a suitable manner for the intended purpose of the vehicle 20. The specific type, style, size, shape, etc. of the body 22 are not pertinent to the teachings of this disclosure, and are therefore not described in detail herein.

The vehicle 20 includes at least one camera, and may include a plurality of cameras. As shown in FIGS. 1 and 2, the vehicle 20 includes a first camera 24, a second camera 26, and a third camera 28. However, it should be appreciated that the vehicle 20 may include a single camera, two different cameras, or more than the exemplary three cameras shown in FIG. 1 and described herein.

As best shown in FIG. 1, the first camera 24 is attached to the body 22, and is positioned to capture an image of a road surface 58 in a first region 30 relative to the body 22. The first region 30 is shown in FIG. 2. A light source 32 is attached to the body 22, and is positioned to illuminate the road surface 58 in the first region 30. The light source 32 may include a light producing device, such as but not limited to a light emitting diode (LED), a flash, a laser, etc. The first camera 24 may include a device suitable for use with image recognition applications, and that is capable of creating or capturing an electronic image, and communicating and/or saving the image to a memory 46 storage device. The specific type, construction, operation, etc. of the first camera 24 is not pertinent to the teachings of this disclosure, and are therefore not described in detail herein.

The first camera 24 and the light source 32 are shown in the exemplary embodiment attached to a side view mirror of the vehicle 20, with the first region 30 being directly beneath the side view mirror. As such, the light source 32 is operable to illuminate the road surface 58 in the first region 30, and the first camera 24 is operable to capture or create an image of the road surface 58 in the first region 30. It should be appreciated that the first camera 24 and the light source 32 may be positioned at some other location on the body 22 of the vehicle 20, and that the first region 30 may be defined as some other region relative to the body 22.

As best shown in FIG. 1, the second camera 26 is attached to the body 22, and is positioned to capture an image of the road surface 58 in a second region 34 relative to the body 22. The second region may include, but is not limited to, a wheel splash region relative to the body 22. The second region 34 is hereinafter referred to as the wheel splash region 34. The second camera 26 may include a device suitable for use with image recognition applications, and that is capable of capturing or creating an electronic image, and communicating and/or saving the image to a memory 46 storage device. The specific type, construction, operation, etc. of the second camera 26 is not pertinent to the teachings of this disclosure, and are therefore not described in detail herein.

The second camera 26 is shown in the exemplary embodiment attached to a front fender of the vehicle 20, with the wheel splash region 34 being just behind a front wheel of the vehicle 20. The wheel splash region 34 is shown in FIG. 2. The wheel splash region 34 is illuminated with ambient light. As such, the third camera 28 does not include a dedicated light. However, in other embodiments, the second camera 26 may include a dedicated light for illuminating the wheel splash region 34. It should be appreciated that the vehicle 20 includes other wheel splash regions 34 for the other wheels of the vehicle 20, and that the second camera 26 may be located at different locations relative to the body 22 in order to capture an image of the other wheel splash regions 34.

As best shown in FIG. 1, the third camera 28 is attached to the body 22, and is positioned to capture an image of the road surface 58 in a third region 36 relative to the body 22. The third region 36 may include, but is not limited to, a region along a side of the vehicle 20 close to the vehicle 20. The third region is hereinafter referred to as the side region 36. The side region 36 is shown in FIG. 2. The third camera 28 may include a device suitable for use with image recognition applications, and that is capable of capturing or creating an electronic image, and communicating and/or saving the image to a memory 46 storage device. The specific type, construction, operation, etc. of the third camera 28 is not pertinent to the teachings of this disclosure, and are therefore not described in detail herein.

The third camera 28 is shown in the exemplary embodiment attached to a floor pan of the vehicle 20, with the side region 36 of the vehicle 20 being laterally spaced outboard of the body 22. The side region 36 is illuminated with ambient light. As such, the third camera 28 does not include a dedicated light. However, in other embodiments, the third camera 28 may include a dedicated light for illuminating the side region 36. It should be appreciated that the vehicle 20 includes other side regions 36, and that the third camera 28 may be located at different locations relative to the body 22 in order to capture an image of the other side regions 36.

While the exemplary embodiment is described with the first camera 24 positioned to capture an image of the first region 30, the second camera 26 positioned to capture an image of the wheel splash region 34, and the third camera 28 positioned to capture an image of the side region 36, it should be appreciated that the specific location of the regions relative to the body 22 may differ from the exemplary first region 30, wheel splash region 34, and the side region 36 described herein, and that the scope of the disclosure is not limited to the first region 30, the wheel splash region 34, and the side region 36 described herein. Furthermore, while the exemplary embodiment is described using three different cameras, i.e., the first camera 24, the second camera, 26, and the third camera 28, it should be appreciated that a single camera or two different cameras may be used with a wide angle lens to capture all three of the exemplary images used in the process described herein. As a result, the different images discussed herein may be portions cut-out or cropped from a single image or two different images taken from a single camera or two different cameras, and need not necessarily be captured independently of each other with independent cameras. Furthermore, each respective image may be cropped from different images. For example, the first image may be cropped from a one image, and the second image may be cropped from another image taken separately.

A computing unit 38 is disposed in communication with the first camera 24, the second camera 26, and the third camera 28. The computing unit 38 may alternatively be referred to as a vehicle controller, a control unit, a computer, a control module, etc., The computing unit 38 includes a processor 40, a convolutional neural network 42, a classifier 44, and a memory 46 having a road surface condition algorithm 48 saved thereon, wherein the processor 40 is operable to execute the road surface condition algorithm 48 to implement a method of identifying a condition of the road surface 58.

The computing unit 38 is configured to access (e.g., receive directly from the first camera 24, the second camera 26, and the third camera 28, or access a stored version in the memory 46) images generated by the first camera 24, the second camera 26, and the third camera 28 respectively. The processor 40 is operable to control and/or process data (e.g., data of the image), input/output data ports, the convolutional neural network 42, the classifier 44, and the memory 46.

The processor 40 may include multiple processors, which could include distributed processors or parallel processors in a single machine or multiple machines. The processor 40 could include virtual processor(s). The processor 40 could include a state machine, application specific integrated circuit (ASIC), programmable gate array (PGA) including a Field PGA, or state machine. When the processor 40 executes instructions to perform "operations," this could include the processor 40 performing the operations directly and/or facilitating, directing, or cooperating with another device or component to perform the operations.

The computing unit 38 may include a variety of computer-readable media, including volatile media, non-volatile media, removable media, and non-removable media. The term "computer-readable media" and variants thereof, as used in the specification and claims, includes storage media and/or the memory 46. Storage media includes volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or a other medium that is configured to be used to store information that can be accessed by the computing unit 38.

While the memory 46 is illustrated as residing proximate the processor 40, it should be understood that at least a portion of the memory 46 can be a remotely accessed storage system, for example, a server on a communication network, a remote hard disk drive, a removable storage medium, combinations thereof, and the like. Thus, a of the data, applications, and/or software described below can be stored within the memory 46 and/or accessed via network connections to other data processing systems (not shown) that may include a local area network (LAN), a metropolitan area network (MAN), or a wide area network (WAN), for example. The memory 46 includes several categories of software and data used in the computing unit 38, including one or more applications, a database, an operating system, and input/output device drivers.

It should be appreciated that the operating system may be a operating system for use with a data processing system. The input/output device drivers may include various routines accessed through the operating system by the applications to communicate with devices, and certain memory components. The applications can be stored in the memory 46 and/or in a firmware (not shown) as executable instructions, and can be executed by the processor 40.

The applications include various programs that, when executed by the processor 40, implement the various features and/or functions of the computing unit 38. The applications include image processing applications described in further detail with respect to the exemplary method of identifying the condition of the road surface 58. The applications are stored in the memory 46 and are configured to be executed by the processor 40.

The applications may use data stored in the database, such as that of characteristics measured by the camera (e.g., received via the input/output data ports). The database includes static and/or dynamic data used by the applications, the operating system, the input/output device drivers, and other software programs that may reside in the memory 46.

It should be understood that the description above are intended to provide a brief, general description of a suitable environment in which the various aspects of some embodiments of the present disclosure can be implemented. The terminology "computer-readable media", "computer-readable storage device", and variants thereof, as used in the specification and claims, can include storage media. Storage media can include volatile and/or non-volatile, removable and/or non-removable media, such as, for example, RAM, ROM, EEPROM, flash memory 46 or other memory 46 technology, CDROM, DVD, or other optical disk storage, magnetic tape, magnetic disk storage, or other magnetic storage devices or some other medium, excluding propagating signals, that can be used to store information that can be accessed by the computing unit 38.

While the description refers to computer-readable instructions, embodiments of the present disclosure also can be implemented in combination with other program modules and/or as a combination of hardware and software in addition to, or instead of, computer readable instructions.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

Figure 3:
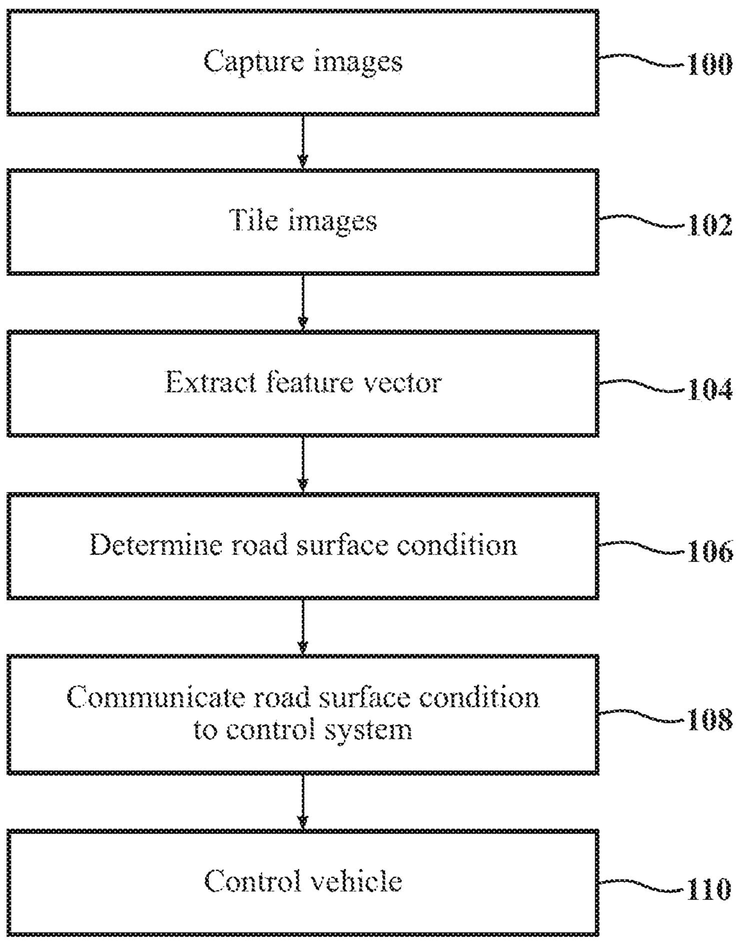
FIG. 3 is a flowchart representing a method of identifying a condition of a road surface.
Figure 4:
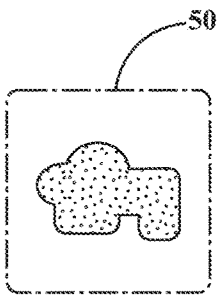
FIG. 4 is a schematic plan view of a first image from a first camera of the vehicle.
Figure 5:
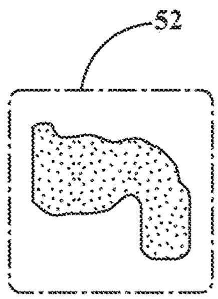
FIG. 5 is a schematic plan view of a second image from a second camera of the vehicle.
Figure 6:
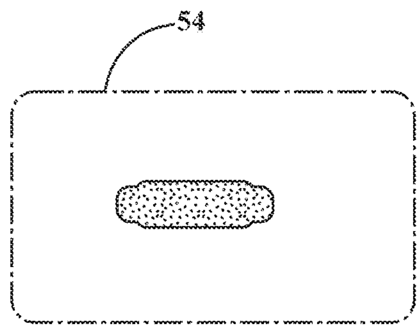
FIG. 6 is a schematic plan view of a third image from a third camera of the vehicle.

As described above, the memory 46 includes the road surface condition algorithm 48 saved thereon, and the processor 40 executes the road surface condition algorithm 48 to implement a method of identifying a condition of the road surface 58. Referring to FIG. 3, the method includes capturing a first image 50 (shown in FIG. 4) of the road surface 58 with the first camera 24, a second image 52 (shown in FIG. 5) of the road surface 58 with the second camera 26, and a third image 54 (shown in FIG. 6) of the road surface 58 with the third camera 28. The step of capturing the first image 50, the second image 52, and the third image 54 is generally represented by box 100 in FIG. 3. The first image 50 is shown in FIG. 4. The first image 50 is actively illuminated by the light source 32, and is an image of the road surface 58 in the first region 30 relative to the body 22. The second image 52 is shown in FIG. 5. The second image 52 is passively illuminated by ambient light, and is an image of the road surface 58 in the wheel splash region 34 of the vehicle 20. The third image 54 is shown in FIG. 6. The third image 54 is passively illuminated by ambient light, and is an image of the road surface 58 in the side region 36 of the vehicle 20, close to the body 22 of the vehicle 20. In an exemplary embodiment, the first image 50 the second image 52 and the third image 54 are captured simultaneously. However, in other embodiments, the first image 50, the second image 52, and the third image 54 may be captured non-simultaneously, with a minimal time gap between the capture of each image.

Figure 7:
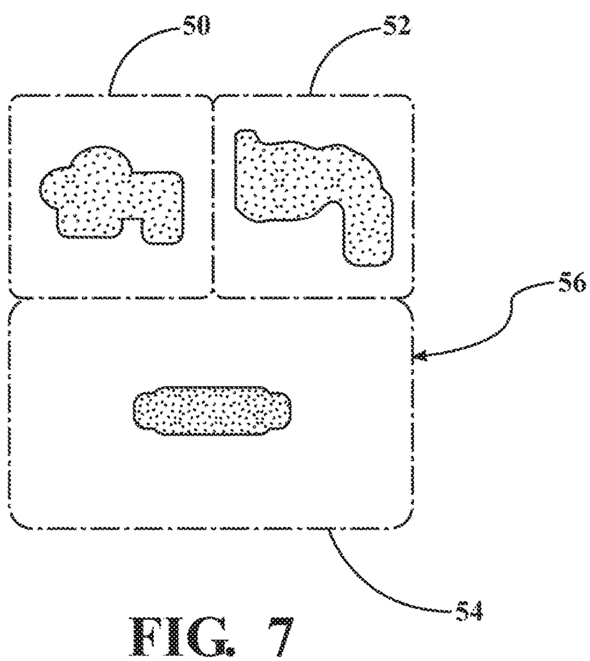
FIG. 7 is a schematic plan view of a combined tile image.

The computing unit 38 then tiles the first image 50, the second image 52, and the third image 54 together to form a combined tile image 56. The step of tiling the first image 50, the second image 52, and the third image 54 is generally represented by box 102 in FIG. 3. The combined tile image 56 is shown in FIG. 7. While the exemplary embodiment is described with the first image 50, the second image 52, and the third image 54, as noted above, the process may be implements with two images, or with more than the three exemplary images. As such, the computing unit 38 tiles the specific number of captured images to form the combined tile image 56. For example, in the exemplary embodiment, the combined tile image 56 includes the first image 50, the second image 52, and the third image 54. However, if two images were used, then the combined tile image 56 would include two images, and if more than the exemplary three images are used, then the combined tile image 56 would include that specific number of images.

The computing unit 38 may tile the first image 50, the second image 52, and the third image 54 together in a sequence, order, or arrangement in which the images are positioned adjacent to each other and do not overlap each other. The computing unit 38 may tile the first image 50, the second image 52, and the third image 54 using an application or process capable of positioning the first image 50, the second image 52, and the third image 54 in a tiled format. The specific application utilized by the computing unit 38 to tile the first image 50, the second image 52 and the third image 54 is not pertinent to the teachings of this disclosure, and are therefore not described in detail herein.

In order to tile the first image 50, the second image 52 and the third image 54 together, a resolution and/or image size of the first image 50, a resolution and/or image size of the second image 52, and a resolution and/or an image size of the third image 54 may need to be defined in the computing unit 38. The respective resolution and image size for each of the first image 50, the second image 52 and the third image 54 may be defined in a suitable manner, such as by inputting/programming the respective data into the computing unit 38, or by the computing unit 38 communicating with and querying the first camera 24, the second camera 26, and the third camera 28 respectively to obtain the information. It should be appreciated that the respective resolution and image size for each of the first image 50, the second image 52, and the third image 54 may be defined in some other manner.

Once the computing unit 38 has tiled the first image 50, the second image 52, and the third image 54 together to define the combined tile image 56, the computing unit 38 may then extract one or more feature vectors from the combined tile image 56. The step of extracting the feature vector is generally represented by box 104 in FIG. 3. The computing unit 38 may extract the feature vectors in a suitable manner, using a suitable image recognition application. For example, in the exemplary embodiment described herein, the computing unit 38 uses the convolutional neural network 42 to extract the feature vector. The convolutional neural network 42 is a deep, feed-forward artificial neural network that use a variation of multilayer perceptrons designed to require minimal preprocessing. The convolution neural network uses relatively little preprocessing compared to other image recognition algorithms, which allows the convolutional neural network 42 may learn the filters to extract the feature vectors over time. The specific features and operation of the convolutional neural network 42 are available in the art, and are therefore not described in detail herein.

Once the convolutional neural network 42 has extracted the feature vector, then the computing unit 38 may determine a condition of the road surface 58 from the feature vector with the classifier 44. The step of determining the condition of the road surface 58 is generally represented by box 106 in FIG. 3. The classifier 44 may determine the condition of the road surface 58 to be a surface defined in the classifier 44. For example, the classifier 44 may be defined to classify the condition of the road surface 58 as one of a dry road condition, a wet road condition, or a snow covered road condition. However, in other embodiments, the classifier 44 may be defined to include other possible conditions other than the exemplary dry road condition, wet road condition, and snow covered road condition noted herein. The manner in which the classifier 44 operates and determines the condition of the road surface 58 from the surface vectors is available to those skilled in the art, and is therefore not described in detail herein. Briefly, the classifier 44 compares the feature vector to files stored in the memory 46 that represent the different conditions of the road surface 58 to match the feature vector with one of the exemplary road condition files.

The computing unit 38 may communicate the identified condition of the road surface 58 to one or more control systems 60 of the vehicle 20, so that those control systems 60 may control the vehicle 20 in a manner appropriate for the current condition of the road identified by the computing unit 38. The step of communicating the condition of the road surface 58 to the control system 60 is generally represented by box 108 in FIG. 3. The control system 60 may then control the vehicle based on the identified condition of the road surface 58. The step of controlling vehicle is generally represented by box 110 in FIG. 3. For example, if the computing unit 38 determines that the condition of the road surface 58 is the snow covered condition, then a control system 60, such as but not limited to a vehicle stability control system, may control braking of the vehicle 20 in a manner suitable for snow covered roads.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A method of identifying a condition of a road surface, the method comprising:

capturing a first image of the road surface with a camera;

capturing a second image of the road surface with the camera;

capturing a third image of the road surface with the camera;

tiling the first image, the second image, and the third image together to form a combined tile image;

extracting a feature vector from the combined tile image using a convolutional neural network; and determining a condition of the road surface from the feature vector with a classifier.

2. The method set forth in claim 1, further comprising:

communicating, via a computing unit of a vehicle, the condition of the road surface to a control system of the vehicle; and controlling, via the control system, an operation of the vehicle based on the condition of the road surface.

3. The method set forth in claim 1, wherein the camera includes a first camera, a second camera, and a third camera, and wherein:

capturing the first image of the road surface with the camera is further defined as capturing the first image of the road surface with the first camera;

capturing the second image of the road surface with the camera is further defined as capturing the second image of the road surface with the second camera; and capturing the third image of the road surface with the camera is further defined as capturing the third image of the road surface with the third camera.

4. The method set forth in claim 1, wherein tiling the first image, the second image, and the third image to form the combined tile image includes positioning the first image, the second image, and the third image adjacent to each other and not overlapping each other to form the combined tile image.

5. The method set forth in claim 1, wherein:

the first image is actively illuminated by a light source;

the second image is passively illuminated by ambient light, and is an image of the road surface in a wheel splash region of a vehicle; and the third image is passively illuminated by ambient light, and is an image of the road surface in a region close to a side of the vehicle.

6. The method set forth in claim 1, wherein the convolutional neural network includes a deep, feed-forward artificial neural network using multilayer perceptrons.

7. The method set forth in claim 1, wherein determining the condition of the road surface from the feature vector with the classifier includes determining the condition of the road surface to be any one of a dry road condition, a wet road condition, or a snow-covered road condition.

8. The method set forth in claim 1, wherein tiling the first image, the second image, and the third image together to define the combined tile image includes defining a resolution of the first image, a resolution of the second image, and a resolution of the third image.

9. The method set forth in claim 1, wherein tiling the first image, the second image, and the third image together to define the combined tile image includes defining an image size of the first image, an image size of the second image, and an image size of the third image.

10. The method set forth in claim 1, wherein the first image and the second image are captured simultaneously.

11. The method set forth in claim 1, wherein capturing the first image and the second image includes cropping the first image and the second image from a single image to form the first image and the second image respectively.

12. The method set forth in claim 1, wherein capturing the first image and the second image includes cropping at least one of the first image and the second image from a respective separate image to form the first image and the second image respectively.

13. The method set forth in claim 1, wherein determining the condition of the road surface includes comparing the feature vector to a plurality of road condition files representative of different road surface conditions to match the feature vector with one of the road condition files.

14. A method of identifying a condition of a road surface, the method comprising:

capturing a first image of the road surface with a first camera, wherein the first image is actively illuminated by a light source;

capturing a second image of the road surface with a second camera, wherein the second image is passively illuminated by ambient light, and is an image of the road surface in a wheel splash region of a vehicle;

capturing a third image of the road surface with a third camera, wherein the third image is passively illuminated by ambient light, and is an image of the road surface in a region close to a side of the vehicle;

tiling the first image, the second image, and the third image together to form a combined tile image;

extracting a feature vector from the combined tile image with a convolutional neural network; and determining a condition of the road surface from the feature vector with a classifier.

15. The method set forth in claim 14, wherein determining the condition of the road surface from the feature vector with the classifier includes determining the condition of the road surface to be any one of a dry road condition, a wet road condition, or a snow-covered road condition.

16. The method set forth in claim 14, wherein tiling the first image, the second image, and the third image together to define the combined tile image includes defining a resolution of the first image, a resolution of the second image, and a resolution of the third image.

17. The method set forth in claim 14, wherein tiling the first image, the second image, and the third image together to define the combined tile image includes defining an image size of the first image, an image size of the second image, and an image size of the third image.

18. The method set forth in claim 14, wherein the first image, the second image, and the third image are captured simultaneously.

19. A vehicle comprising:

a body;

at least one camera attached to the body and positioned to capture an image of a road surface in a first region relative to the body, and an image of the road surface in a second region relative to the body;

a light source attached to the body and positioned to illuminate the road surface in the first region; and a computing unit having a processor, a convolutional neural network, a classifier, and a memory having a road surface condition algorithm saved thereon, wherein the processor is operable to execute the road surface condition algorithm to:

capture a first image of the road surface in the first region with the at least one camera, with the first image actively illuminated by the light source;

capture a second image of the road surface in the second region with the at least one camera;

tile the first image and the second image together to form a combined tile image;

extract a feature vector from the combined tile image with the convolutional neural network; and determine a condition of the road surface from the feature vector with the classifier.

20. The vehicle set forth in claim 19, wherein the at least one camera includes a first camera positioned to capture the image of the road surface in the first region, and a second camera positioned to capture theH image of the road surface in the second region.

* * * * *